United States Patent
Chszaniecki

(10) Patent No.: US 6,592,350 B1
(45) Date of Patent: Jul. 15, 2003

(54) UNDERWATER PELLETIZER WITH SEPARATOR

(75) Inventor: Siegfried Chszaniecki, Hannover (DE)

(73) Assignee: Berstorff GmbH, Hannover (DE)

( * ) Notice: Subject to any disclaimer, the term of this patent is extended or adjusted under 35 U.S.C. 154(b) by 0 days.

(21) Appl. No.: 09/533,628

(22) Filed: Mar. 22, 2000

(30) Foreign Application Priority Data

Mar. 23, 1999 (DE) ......................................... 199 14 116

(51) Int. Cl.⁷ ................................................. B29B 9/16
(52) U.S. Cl. ........................ 425/67; 425/313; 425/311; 425/DIG. 230
(58) Field of Search ..................... 425/67, 308, 310, 425/311, 313, 315, 316, 309, DIG. 230, 72.2, 382.2, 71, 70, 68; 83/607, 675, 906

(56) References Cited

U.S. PATENT DOCUMENTS

| | | | |
|---|---|---|---|
| 2,153,031 A | * 4/1939 | Zetzsche et al. | 264/143 |
| 2,311,389 A | * 2/1943 | Hawks et al. | 106/273.1 |
| 2,539,916 A | * 1/1951 | Ludington et al. | 425/311 |
| 2,614,290 A | * 10/1952 | Street | 425/311 |
| 3,029,466 A | * 4/1962 | Guill | 264/DIG. 37 |
| 3,600,745 A | * 8/1971 | Hench et al. | 425/192 R |
| 3,988,085 A | * 10/1976 | Krchma | 264/141 |
| 4,410,306 A | * 10/1983 | Anders et al. | 264/142 |
| 4,616,055 A | * 10/1986 | Mason | 524/381 |
| 4,728,276 A | * 3/1988 | Pauley et al. | 264/142 |
| 4,970,043 A | * 11/1990 | Doan et al. | 264/237 |
| 5,597,586 A | * 1/1997 | Wilson et al. | 264/142 |

FOREIGN PATENT DOCUMENTS

| | | |
|---|---|---|
| DE | AS 1 221 783 | 7/1966 |
| DE | AS 1 454 888 | 2/1969 |
| DE | 35 41 500 C2 | 5/1987 |
| GB | 2 010 288 A | 6/1979 |

\* cited by examiner

*Primary Examiner*—Robert Davis
*Assistant Examiner*—Joseph S Del Sole
(74) *Attorney, Agent, or Firm*—Henry M. Feiereisen

(57) ABSTRACT

An underwater pelletizer for granulating thermoplastics, includes an extruder having a die plate with holes for extruding thermoplastics in the form of single strands which are cut by a rotating cutting tool in short pieces in a cutting plane in parallel relation to an exit plane of the die plate, thereby forming a granulated product. The exit plane of the die plate and the cutting tool are positioned in a chamber which is filled with cooling water streaming through the chamber. The chamber has a cooling water inlet, which is arranged above the pivot axis of the cutting tool, and an outlet, arranged beneath the pivot axis of the cutting tool, for discharge of a mixture of water and granulated product, whereby the outlet is configured as free discharge opening which opens into a separator, positioned immediately underneath the outlet, for separating the granulated product from the cooling water.

9 Claims, 1 Drawing Sheet

UNDERWATER PELLETIZER WITH SEPARATOR

CROSS-REFERENCES TO RELATED APPLICATIONS

This application claims the priority of German Patent Application Serial No. 199 14 116.9, filed Mar. 23, 1999, the subject matter of which is incorporated herein by reference.

BACKGROUND OF THE INVENTION

The present invention relates to an underwater pelletizer for granulating thermoplastics. The present invention further relates to a method for granulating thermoplastics.

Thermoplastics are transformed through injection molding or blow molding into finished products which are typically fed in the form of particles or granules to respective plastics processing machines. This granulated material is made from raw plastics which is oftentimes mixed with additives such as pigments or reinforcing agents, and processed in extruders and pelletizers for cutting the raw material extruded from the extruding dies.

In water-ring pelletizers, thermoplastic material is plasticized and pressed through a plurality of die holes in a die plate, which is located at the exit of the extruder, for producing comparably thin single strands when leaving the die holes. Immediately after leaving the die, the strands are cut to relative fine pellets or particles of relatively short length by blades of a rotating cutting tool which moves in close proximity past the exit plane of the die plate. Surrounding the cutting tool and the die plate is a ring-shaped cooling chamber which has a substantially cylindrical inner wall for conducting a thin stream of cooling water that has been injected tangentially. Water-ring pelletizers of this type are known, for example, from German Pat. Nos. DE-AS 1 221 783 and DE-AS 1 454 888.

Other types of pelletizers include so-called underwater pelletizers which differ from the water-ring pelletizers by the fact that cooling water circulates through and fills the entire cooling chamber. Normally, cooling water is injected from below or conducted through the driveshaft of the cutting tool into the chamber to ensure a complete filling of the chamber with cooling water throughout. Cooling water leaves the chamber through an outlet, which is normally located at an upper area of the chamber, and carries off the granulated material, produced in the cooling chamber in the form of a solid/water mixture, when leaving the chamber. Directly connected to the outlet is a conduit for transport of the granulated material to a separator in which the solidified particles are separated from the cooling water and subsequently dried.

An underwater pelletizer of this type is described, for example, in British Pat. No. GB 2 010 288 A. The pelletizer includes an extruder with a die plate for directly extruding plastic material into a cooling chamber filled with cooling water, whereby cooling water is injected from below and exits from above. Arranged in the cooling chamber is a cutting tool which rotates about a horizontal pivot axis and is operated by an electric motor. This conventional pelletizer is not intended for making particles of plastic material but is provided to realize a rapid production of an aqueous solution of a water-soluble polymer which is extruded in the form of a gel through the die plate. For that reason, a further chamber is arranged between the cooling water outlet and the cooling chamber, for accommodating a rotating rotor therein in order to accelerate the solution of the gel in water through applying an intense shear action.

Underwater pelletizers are suitable for use with thermoplastics, such as PP, PE or PVC, whereas their application for other materials, which have the undesired tendency to absorb water at a relatively high degree, is accompanied by deteriorating quality of the finished product. Pelletizing of such plastics, which are sensitive to cooling water, is normally carried out by a process, called strand cutting, in which relatively long plastics strands are continuously extruded through a die plate, and subsequently transported, freely suspended, along a short path through air and then conducted through a water bath which is located downstream of the extruder. As a result of the significantly reduced specific (as relating to volume) surface of a plastics strand compared to granulated material, the water absorption is maintained within narrow limits. After cooling down the individual strands in the water bath, the individual strands are dried and transferred, pre-dried and cooled, to a pelletizer. Thus, granulation does not take place in a thermoplastic state, but in a solid state. Subsequently, drying is typically executed again.

While the strand cutting process ensures a short cooldown period and good drying of the particles, this process requires relatively complex maintenance works, especially when plants of high output are involved, because individual extruded strands oftentimes tear off. Moreover, deposits are formed outside on the die plate and adversely affect the quality of the product. This is true, in particular, for polyamide compounds. Moreover, especially when plants with high throughput are involved, appropriate drying of the particles may be difficult. In the event of an excessive temperature rise of the material, degradation may be experienced, causing damage to the plastic material being processed.

SUMMARY OF THE INVENTION

It is thus an object of the present invention to provide an improved underwater pelletizer, obviating the afore-stated drawbacks.

In particular, it is an object of the present invention to provide an improved underwater pelletizer which is suitable for plastics that have the undesired tendency to absorb water when coming into contact with cooling water.

These objects, and others which will become apparent hereinafter, are attained in accordance with the present invention by providing at least one extruder having at least one die plate formed with die holes for extruding thermoplastics into single strands, at least one motor-driven cutting tool rotating about a horizontal pivot axis for cutting the strands in short pieces in a cutting plane in parallel relation to an exit plane of the die plate, thereby forming a granulated product, whereby the exit plane of the die plate and the cutting tool are positioned within the chamber which is filled with cooling water streaming through the chamber, with the chamber having a cooling water inlet, which is arranged above the pivot axis of the cutting tool, and an outlet, arranged beneath the pivot axis of the cutting tool, for a mixture of water and granulated product, with the outlet being configured as free discharge opening, and a separator connected to the outlet and positioned immediately underneath the outlet for separating cooling water from the granulated product.

Compared to conventional underwater pelletizers, an underwater pelletizer according to the present invention ensures at operation an extremely short retention time of produced granulated material in cooling water, because the water inlet is disposed above and the outlet for cooling water is disposed below the pivot axis of the rotating cutting tool used for pelletizing, and because the outlet is configured as a free discharge opening which is immediately followed by the separator positioned underneath the outlet. Thus, the provision of a conduit for transport of cooling water and particles to the separator is eliminated, as, in accordance with the present invention, the particles are transferred by cooling water, falling from top to bottom through the pelletizer, directly to the separator after an extremely brief retention time in cooling water of about 1 to 2 seconds. This short retention time in cooling water is not long enough to attain a sufficient cooling of individual particles of the granulated product; rather, a granulated product is realized which has solidified but still retains sufficient residual heat.

As stated above, plastics, such as polyamide or polyester, have a tendency to absorb water. These plastics have a relatively distinct melting point, and, after solidification, do not show a tendency for adhesion. The present invention exploits these properties because a relatively slight temperature decrease of plastic, extruded closely above the melting temperature, ensures a sufficient solidification, without experiencing agglomeration of the particles.

According to another feature of the present invention, the water inlet and the outlet for cooling water are arranged diametrically opposite to one another in relation to the pivot axis of the rotating cutting tool. Suitably, the water inlet and the outlet are in superimposed disposition in a fall line.

According to another feature of the present invention, the die holes of the die plate for extruding the plastics are so distributed across the exit plane that the cutting tool, rotating about a horizontal pivot axis, cuts the strands of the extruded plastic only during a descending motion of its blades, i.e. while the blades are essentially in flow direction of the cooling water.

The separator may, for example, be designed as belt filter or vibratory separator. Of course, other types of separators may be applicable as well, without departing from the spirit of the present invention, so long as a rapid separation of cooling water from the granulated material is implemented. As a consequence of the residual heat of the granulated material and resultant water evaporation, a steam vent is suitably provided in the region of the separator.

A high output of the pelletizer according to the present invention can be accomplished when providing a plurality of die plates and a corresponding number of cutting tools in the cooling chamber. Practice has shown that the provision of two die plates in side-by-side disposition in the cooling chamber is advantageous, with their die holes opposing one another in groups as mirror images. Each of the die plates cooperates with a cutting tool, whereby the direction of rotation of the two cutting tools is opposite to one another. Suitably, when the pelletizer has two die plates, the die holes are each arranged along a segment of a circle on the outer sides of the die plates, which outer sides face away from one another. A compact configuration can thereby be realized when providing the distance of the die plates and thus the distance of the pivot axes of the cutting tools such that the distance of the pivot axes is smaller than the outer diameter of a rotation path traveled by the blades of the cutting tools. As a consequence, the blades, running in opposite directions, should be driven just like gears in a gear mechanism, i.e. in meshing engagement with one another.

It is yet another object of the present invention to provide an improved method for granulating thermoplastics which have a tendency to absorb water, especially polyamide or polyester.

This object is attained in accordance with the present invention by a process having the following steps: extruding plasticized plastic through die holes of a die plate to form strands; directing the strands, after emerging from the die holes, into a cooling chamber filled with cooling water streaming through the chamber; cutting the strands in the chamber to a granulated material of a desired particle size, while still being in plasticized state, with the cutting direction extending essentially in flow direction of the cooling water through the chamber; directly discharging the granulated material from the chamber together with cooling water; separating the granulated material, while still being at elevated temperature, from cooling water immediately after exiting the chamber; and allowing the granulated material to dry by way of its own heat.

In accordance with the present invention, the extruded strands are cooled in a water bath and cut into small particles. An inadmissible water absorption is avoided and a cost-efficient and effective drying action is ensured by directly transferring the extruded strands into the cooling chamber in which the still plasticized strands are cut to the desired particle size. The produced particles give off heat to the cooling water in the area of their surface, thereby realizing a hardening in the surface region. Cutting of the strands into particles is suitably realized in accordance with the present invention, by providing the cutting direction essentially in flow direction of the streaming cooling water through the cooling chamber. This ensures that the granulated material is retained in the cooling chamber for a period that is as short as possible, and then directly discharged from the cooling chamber by the passed cooling water after a brief period. Immediately after emerging from the cooling chamber, the still warm particles produced in the cooling chamber after the cutting procedure, are separated from the cooling water and dried immediately by their own heat. A sudden cooling of the particles by cooling water can be avoided by injecting warm cooling water into the cooling chamber. As presently believed, the injected warm cooling water should have a temperature in the range of about 40° C. to 80° C., preferably about 60° C. This prevents a thermal shock of the particles while ensuring a sufficient own heat of the particles to realize a good drying action of the granulated material after separation of the cooling water.

The method according to the present invention and the pelletizer according to the present invention are characterized by a high efficiency while yet being substantially maintenance-free and highly energy-efficient to produce plastic particles that may exhibit a high propensity to water absorption.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
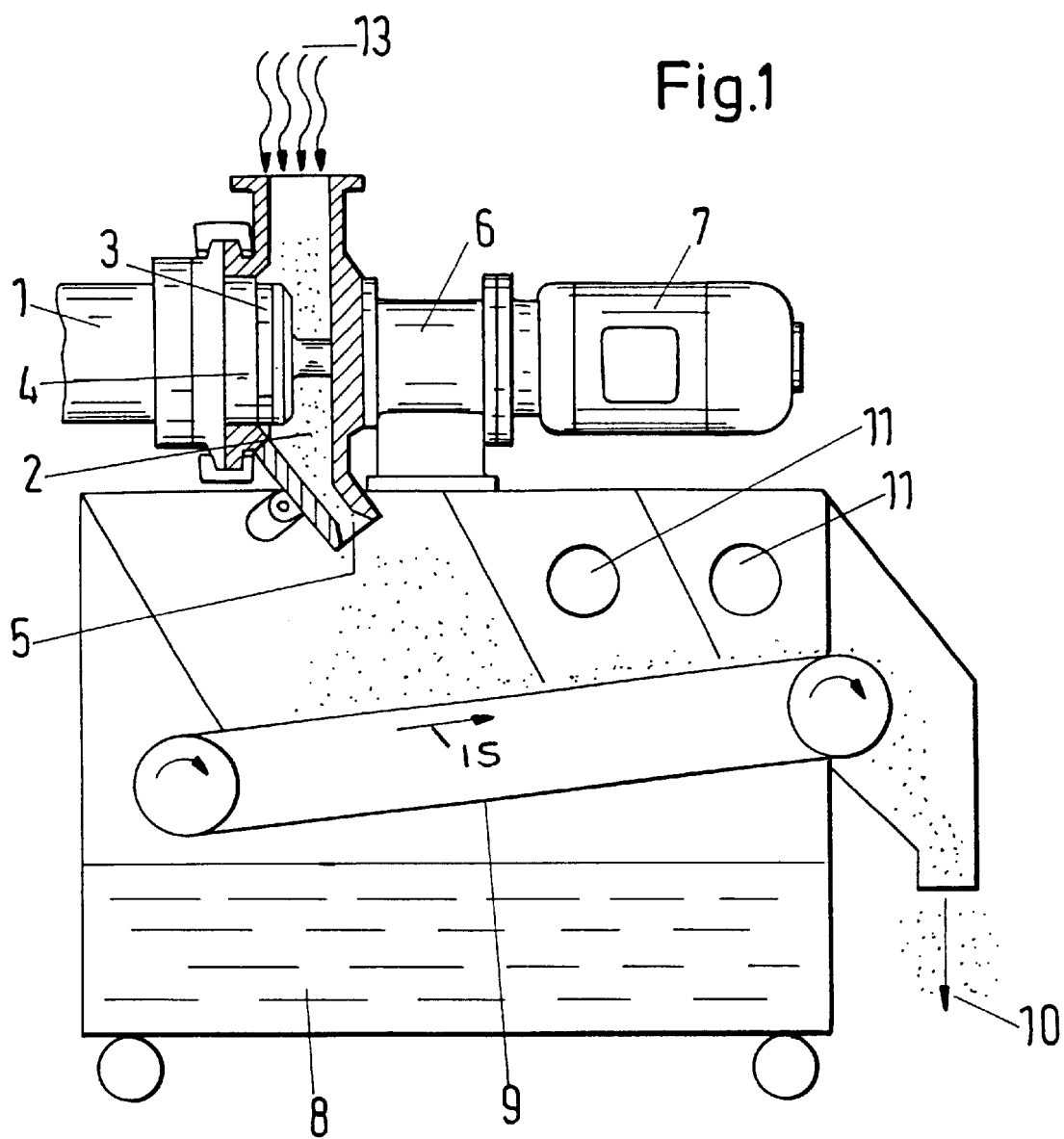
FIG. 1 is a partially, sectional view of an underwater pelletizer according to the present invention.

Throughout all the Figures, same or corresponding elements are generally indicated by same reference numerals.

Turning now to the drawing, and in particular to FIG. 1, there is shown an underwater pelletizer according to the present invention, including an extruder 1 for producing a melt of a thermoplastic, e.g. polyamide or polyester. Connected to the extruder is a die plate 4 which includes a plurality of die holes 12 (FIG. 2) for extruding the plastic melt into single strands. A multibladed cutting tool or knife is arranged downstream of the die plate 4 and is driven e.g. by an electric motor 7 for rotation about a horizontal pivot axis. The cutting tool 3 cuts the strands of the extruded plastic melt into short pellets of desired particle size along a cutting plane lying parallel to the exit plane of the die plate 4. The die plate 4 and the cutting tool 3 are located in a cooling chamber 2 which is filled with cooling water and through which cooling water flows. The cooling chamber 2 has a water inlet 13 and an outlet 5 for discharge of a mixture of water and particles produced in the cooling chamber 2, with the water inlet 13 being arranged above the pivot axis of the cutting tool 3 and the outlet 5 being arranged diametrically opposite to the inlet 13 below the pivot axis of the cutting tool 3. The water inlet 13 and the outlet 5 are thus arranged in superimposed disposition in a fall line, so that cooling water can flow unobstructed through the cooling chamber 2 to carry off the severed particles.

Disposed between the cutting tool 3 and the drive motor 7 is a drive and adjustment device 6 for correctly positioning the cutting tool 3 with respect to the surface of the die plate 4.

As clearly shown in FIG. 1, the outlet 5 is formed as free discharge opening, without connection to a conduit, and terminates immediately above a separator 9. Thus, an extremely short retention time of produced granulated material in cooling water is realized which may last about 1 to 2 seconds. Examples of a separator 9 includes a belt filter, as shown by way of example in FIG. 1, or a vibratory separator. Of course, other types of separators may be applicable as well, without departing from the spirit of the present invention, so long as a rapid separation of cooling water from the particles is realized. Thus, the particles travel a shortest possible distance to the separator 9 in which the particles are separated from cooling water. During the comparably short cooling down period, the plastic merely solidifies in the surface area while yet retaining a high heat content which is sufficient to evaporate cooling water still adhering on the particles, without a need for an external supply of drying energy. A thermal shock of the particles through contact with cooling water can be avoided when the cooling water is warm when injected into the cooling chamber. As presently understood, the cooling water should have a temperature in the range of about 40° C., to 80° C., preferably about 60° C., thereby ensuring a sufficient own heat of the particles to realize a good drying action of the granulated material after separation of the cooling water. Generated water vapor can then be released via a vapor vent 11.

Disposed underneath the separator 9 is a tank 8 which contains cooling water and is suitably incorporated in the water circulation, so that cooling water separated from the particles can drip into the tank 8. The granulated material retained by the separator 9 is transported in the direction of the arrow 15 by the conveying movement of the band filter. After evaporation of still adhering cooling water, the granulated material is sufficiently dry and removed through outlet 10 for further processing, e.g., to a sifter (not shown) for classification into desired particle sizes.

Figure 2:
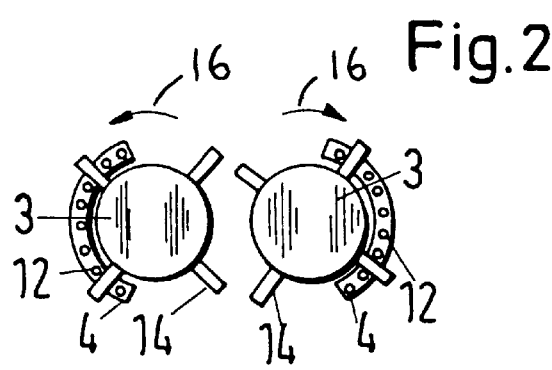
FIG. 2 is a schematic plan view of a pelletizer with two die plates and two cutting tools.

Turning now to FIG. 2, there is shown a schematic plan view of a pelletizer in the form of a double-head configuration, i.e. with two neighboring die plates 4 and two cutting tools 3 which respectively interact with the die plates 4. The extruding holes 12 of both die plates 4 are so spread over the exit plane of the die plates 4 that the cutting tool 3 cuts the strands of the extruded plastic only during a downward motion of its blades 14. The rotation directions of both cutting tools 3 are opposite to one another, as indicated by arrows 16. The die holes 12 are each arranged about a segment of a circle on outer sides of both die plates 4, which outer sides face away from one another, so that the cutting operation is carried out only during the downward motion of the blades 14. Thus, the direction of the cutting movement is realized substantially in the direction of the stream of cooling water through the cooling chamber 2. As shown in FIG. 2, the spacing between both pivot axes of the cutting tools 3 is smaller than the outer diameter of the rotation paths as traveled by the blades 14 of the cutting tools 3. A collision of blades 14 during operation in opposite directions of the die plates 3 is prevented by a meshing engagement of the blades 14, resembling meshing gears of a gear mechanism. This configuration leads to a particular compact design of the pelletizer.

While the invention has been illustrated and described as embodied in a underwater pelletizer, and method for granulating thermoplastics, it is not intended to be limited to the details shown since various modifications and structural changes may be made without departing in any way from the spirit of the present invention.

What is claimed as new and desired to be protected by Letters Patent is set forth in the appended claims.

What is claimed is:

1. An underwater pelletizer for granulating thermoplastics, comprising:

at least one extruder;

at least one die plate connected to the extruder and having die holes for extruding thermoplastics in the form of single strands;

at least one motor-driven cutting tool rotating about a horizontal pivot axis for cutting the strands in short pieces in a cutting plane in parallel relation to an exit plane of the die plate, thereby forming a granulated product;

means forming a chamber which is filled with cooling water streaming through the chamber, said exit plane of the die plate and said cutting tool being positioned within the chamber, said chamber having a cooling water inlet, which is arranged above the pivot axis of the cutting tool, and an outlet, arranged beneath the pivot axis of the cutting tool, for discharge of a mixture of water and granulated product, said outlet being configured as a free discharge opening; and a separator connected to the outlet for separating the granulated product from the cooling water, said separator being positioned immediately underneath the outlet.

2. The pelletizer of claim 1 wherein the water inlet and the outlet are arranged on opposite sides of the pivot axis of the cutting tool.

3. The pelletizer of claim 2 wherein the water inlet and the outlet are arranged in a fall line in superimposed disposition.

4. The pelletizer of claim 1 wherein the cutting tool has blades, said die holes being so distributed across the exit plane of the die plate that the blades of the cutting tool cut the strands only during a descending motion thereof in a flow direction of the cooling water.

5. The pelletizer of claim 1 wherein the separator is configured as one of a belt filter and vibratory separator.

6. The pelletizer of claim 1, and further comprising a vapor vent provided in an area of the separator.

7. The pelletizer of claim 1, having a further one of said die plate and a further one of said cutting tool, said two die plates arranged in side-by-side disposition in the chamber with their die holes confronting one another in groups as mirror images, said two cutting tools interacting with the two die plates in one-to-one correspondence and running in opposite rotation directions.

8. The pelletizer of claim 7 wherein the die holes are disposed about a circular segment on outer sides of the two die plates which outer sides face away from one another.

9. The pelletizer of claim 7 wherein the two cutting tools have blades, said pivot axes of the two cutting tools being spaced from one another at a distance which is smaller than an outer diameter of a rotation path traveled by the blades of the cutting tools.

* * * * *